United States Patent
Yabusaki

(10) Patent No.: US 11,200,699 B2
(45) Date of Patent: Dec. 14, 2021

(54) IMAGE ANALYSIS EVALUATION METHOD, COMPUTER PROGRAM, AND IMAGE ANALYSIS EVALUATION DEVICE

(71) Applicant: KOWA COMPANY, LTD., Aichi (JP)

(72) Inventor: Katsumi Yabusaki, Higashimurayama (JP)

(73) Assignee: KOWA COMPANY, LTD., Aichi (JP)

( * ) Notice: Subject to any disclaimer, the term of this patent is extended or adjusted under 35 U.S.C. 154(b) by 29 days.

(21) Appl. No.: 16/609,669

(22) PCT Filed: Apr. 27, 2018

(86) PCT No.: PCT/JP2018/017114
§ 371 (c)(1),
(2) Date: Oct. 30, 2019

(87) PCT Pub. No.: WO2018/203514
PCT Pub. Date: Nov. 8, 2018

(65) Prior Publication Data
US 2020/0151909 A1    May 14, 2020

(30) Foreign Application Priority Data
May 1, 2017 (JP) .............................. JP2017-090950

(51) Int. Cl.
*G06T 7/00* (2017.01)
*G06T 7/90* (2017.01)

(52) U.S. Cl.
CPC ...... *G06T 7/90* (2017.01); *G06T 2207/10004* (2013.01); *G06T 2207/10024* (2013.01)

(58) Field of Classification Search
CPC ............. G06T 7/90; G06T 2207/10004; G06T 2207/10024; G06T 2207/30088; G06T 2207/20112; G06T 7/11
See application file for complete search history.

(56) References Cited

U.S. PATENT DOCUMENTS

2015/0141278 A1* 5/2015 Hollman-Hewgley ...................... G06T 7/0012 506/9
2017/0236259 A1* 8/2017 Park ................... H04N 9/04561 382/167

(Continued)

FOREIGN PATENT DOCUMENTS

| JP | H08-308634 A | 11/1996 |
| JP | H09-038045 A | 2/1997 |

(Continued)

OTHER PUBLICATIONS

Rahil et al., "Automatic Segmentation of Dermoscopy Images Using Histogram Thresholding on Optimal Color Channels," Jan. 2010, International Journal of Medical Sciences, 1:2; pp. 126-134 (Year: 2010).*

(Continued)

*Primary Examiner* — Ping Y Hsieh
(74) *Attorney, Agent, or Firm* — McDermott Will and Emery LLP

(57) ABSTRACT

Provided are an analysis evaluation method and device, and a computer program for the state of a subject surface in a still image. The method includes: a step of acquiring color information of each pixel in a predetermined region in a still image, a step of calculating a numerical value indicating a diversity of color from the acquired color information, a step of calculating an average value of the color information, and a step of calculating a coefficient of variation on the basis of the calculated numerical value indicating the diversity of color and the calculated average value of the color information. Herein, the coefficient of variation is used as an index for evaluating the surface state of an object.

6 Claims, 2 Drawing Sheets

(56) References Cited

U.S. PATENT DOCUMENTS

2019/0268517 A1* 8/2019 Hwang ............... H04N 5/2256
2020/0074627 A1* 3/2020 Yokoi ................ A61B 5/1032
2020/0315446 A1* 10/2020 Yabusaki ............ A61B 3/101

FOREIGN PATENT DOCUMENTS

JP        2006-141734 A    6/2006
JP        2014-104132 A    6/2014

OTHER PUBLICATIONS

International Search Report and Written Opinion issued in International Patent Application No. PCT/JP2018/017114, dated Jul. 24, 2018; with partial English translation.
M Emre Celebi et al.,"Automatic Segmentation of Dermoscopy Images Using Histogram Thresholding on Optimal Color Channels," International Journal of Medicine and Medical Sciences, 1:2; 2010; pp. 126-134 with Research Gate cover page.
Yang, G. et al." Research on a Skin Color Detection Algorithm Based on Self-adaptive Skin Color Model," 2010 International Conference on Communications and Intelligence Information Security; IEEE Computer Society; pp. 266-270; ISBN 978-1-4244-8649-6.
Pathan, S. et al., "Techniques and algorithms for computer aided diagnosis of pigmented skin lesions—A review," Biomedical Signal Processing and Control; 2018, 39, pp. 237-262; ISSN: 1746-8094.
Extended European Search Report issued in European Patent Application No. 18794142.2, dated Dec. 14, 2020.

* cited by examiner

[FIG. 1]
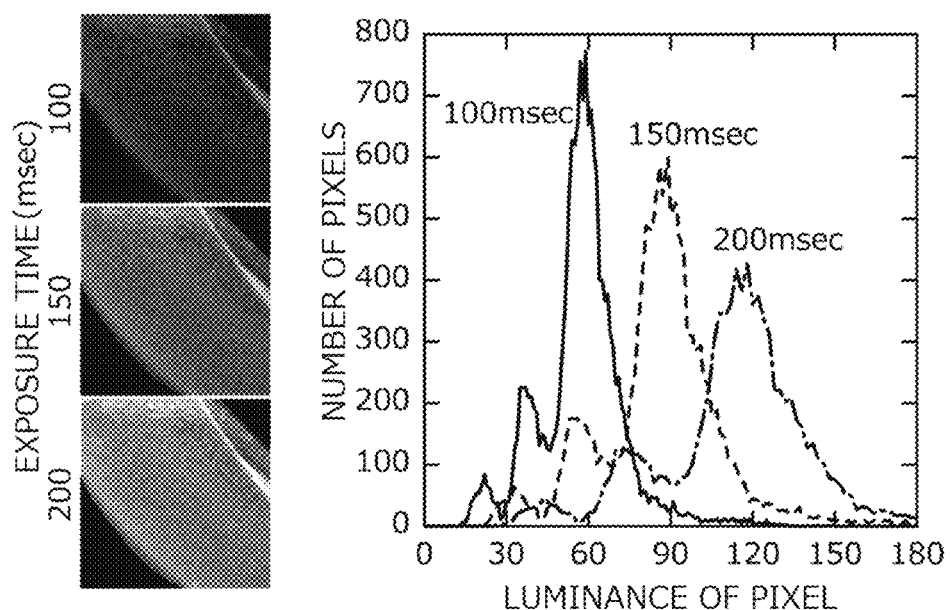
[FIG. 2]
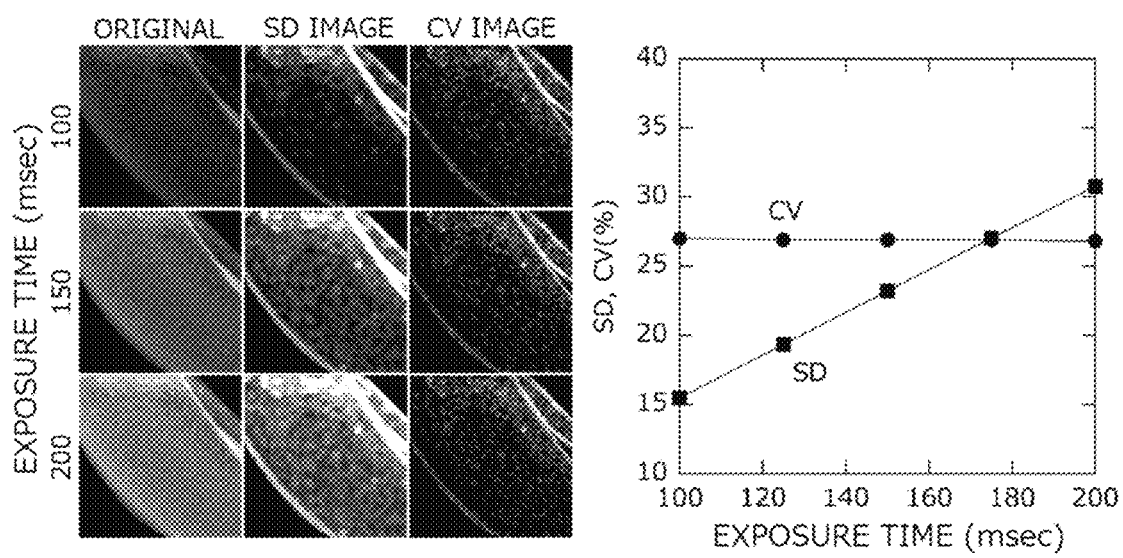

[FIG. 3]
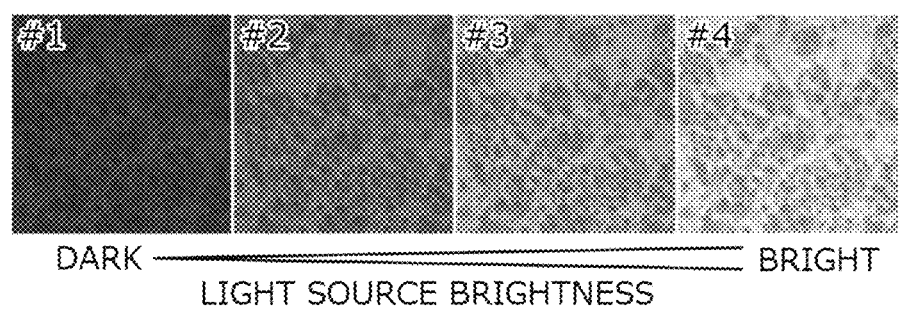
| IMAGE | SD | CV(%) |
|---|---|---|
| #1 | 6.19 | 10.6 |
| #2 | 11.00 | 11.4 |
| #3 | 16.17 | 11.9 |
| #4 | 21.13 | 12.3 |

IMAGE ANALYSIS EVALUATION METHOD, COMPUTER PROGRAM, AND IMAGE ANALYSIS EVALUATION DEVICE

CROSS-REFERENCE OF RELATED APPLICATIONS

This application is the U.S. National Phase under 35 U.S.C. § 371 of International Patent Application No. PCT/JP2018/017114, filed on Apr. 27, 2018, which in turn claims the benefit of Japanese Application No. 2017-090950, filed on May 1, 2017, the entire disclosures of which Applications are incorporated by reference herein.

FIELD

The present invention relates to a method, device, and computer program for analyzing and evaluating images by using the diversity of color present in, in particular, still images.

BACKGROUND

For example, analyzing the complexity of the surface or internal structure of a sample or the color complexity from the color and shading of brightness of still images obtained by photographing an object or living body and a sample derived from a living body using a microscope is widely performed in various fields. For example, as shown in Patent Literatures 1 and 2, methods for quantifying skin conditions have been attempted.

CITATION LIST

Patent Literature

Patent Literature 1: Japanese Patent Application Laid-Open No. Hei. 8-308634
Patent Literature 2: Japanese Patent Application Laid-Open No. Hei. 9-38045

SUMMARY

Technical Problem

However, there is a problem in that the complexity cannot be correctly evaluated because the color and the shading of the brightness of the image change depending on the exposure time at the time of photographing and the brightness of the illumination light.

Solution to Problem

The present invention has been made in view of the conventional problems described above and an object of the present invention is to provide a method and device for evaluating a surface or an internal structure of a sample or a complexity of color thereof by evaluating a color variation or a shading variation of brightness of pixels as a coefficient of variation.

An image analysis evaluation method, device and computer program according to the present invention include the following steps or means:

(1) a step of acquiring color information of each pixel in a predetermined region in a still image, a step of calculating a numerical value indicating a diversity of color (deviation value, such as variance and standard deviation, of the color information from the acquired color information, a step of calculating an average value of the color information, and a step of calculating a coefficient of variation on the basis of the calculated numerical value indicating the diversity of color and the calculated average value of the color information. Herein, the coefficient of variation is used as an index for evaluating a surface state.

(2) In the (1) described above, the color information is luminance or brightness of the pixel, and the numerical value indicating the diversity of color is a variation of the luminance or the brightness.

(3) In the (2) described above, the variation of the luminance or the brightness is a standard deviation of the luminance or the brightness.

(4) In the (1) to (3) described above, the coefficient of variation is a numerical value obtained by dividing the numerical value indicating the diversity of color by the average value of the color information.

(5) In the (1) to (4) described above, a step of calculating a region area of a region indicated by the coefficient of variation that exceeds a threshold value and a determination step of determining whether the region area exceeds a threshold value are included.

Advantageous Effects of Invention

The present invention exhibits the following advantageous effects. A surface of an object in a still image, a state of a structure included therein, or the complexity of color can be digitized by determining the diversity of color in a region of interest of the image on the basis of the color information of a pixel included in such a region. This makes it possible to objectively evaluate the complexities of structure and color without depending on subjectivity, experiences, or the like of an observer.

Further, a planar (or spatial) distribution of the state of the surface can be evaluated by dividing the still image into a number of regions and calculating the numerical value representing the diversity of color in each region, or by specifying each pixel or a small group of pixels and calculating the numerical value representing the diversity of color in a region surrounding each pixel or the small group of pixels. This makes it possible to easily and objectively determine a site in which the structure or color is complex on the image.

BRIEF DESCRIPTION OF DRAWINGS

FIG. 1 shows diagrams illustrating a luminance histogram of the number of a red color element extracted from RGB color space in three types of still images.

FIG. 2 shows a diagram (left side) representing the standard deviation of the luminance of an image of a part, or showing an image as a coefficient of variation obtained by dividing the standard deviation by the average value of the luminance wherein the image was obtained by photographing as still images, with a microscope at various exposure times, a part of a plastic part that has been subjected to an emboss processing, and a graph (right side) in which the complexity of the structure of the image is digitized by the standard deviation of the image or the coefficient of variation.

FIG. 3 shows images (upper side) obtained by microscopically photographing samples with light sources of various brightness, the samples obtained by staining oil droplets in cross-sections of livers of mice that developed non-alcoholic fatty liver (Nash models) with dye, and a table (lower side) of standard deviations of the images, and complexities of stainability evaluated by coefficients of variation.

DESCRIPTION OF EMBODIMENTS

Hereinafter, embodiments of the present invention will be described by way of examples. In the present invention, color information of all or a part of pixels in an entire region of an image of a still image or at least one or more regions arranged in the image is acquired and a diversity of color of at least two or more of the pixels is calculated to analyze and evaluate the complexities of a structure and color in the image on the basis of the brightness of the image or the diversity of color shown in such a region.

<Image Acquisition>

As a device for acquiring an image used in the present invention (an image acquisition device), a conventionally known device such as a digital camera system capable of performing coaxial illumination may be appropriately used as long as it can record the photographed image as image information of digital data.

The image acquisition device is physically or logically connected to an image analysis evaluation device according to the present invention. The image analysis evaluation device includes a processing unit configured to compute and process data and a storing unit configured to store the still image data acquired by an image acquisition device, The storing unit stores a computer program and prescribed data for implementing the present invention, and the processing unit processes data according to a predetermined instruction by the computer program and the like.

<Acquisition of Image Color Information>

A specific processing of the image analysis evaluation device will be described below. The color information is acquired from the image data acquired from the image acquisition device and a diversity of color is calculated to obtain an index for evaluating the state of the surface of a subject. A description will next be given of a method of using color elements of three colors including red, green. and blue (numerical values in the RGB color space), which is a color system used in many electronic image apparatuses, as the color information to be used in the present invention.

Specifically, the color information of each pixel is luminance or brightness of color elements of red, green, and blue possessed by a pixel, and, as the color information of each pixel, luminance of at least one or more color elements of red, green, and blue in the RGB color space may be directly used or a secondary numerical value calculated from the color information may be obtained and used. For example, as a method for creating a gray scale suitable for human color perception, a calculation method in which the luminance of each of red, green, and blue is multiplied by a corresponding predetermined coefficient (for example, red "0.298912", green "0.586611", blue "0.114478") and then the resulting values are summed up is known. As exemplified above, the color information may be processed into gray scale gradation by a predetermined method and used.

Further, the luminance of any of the color elements may be used solely or two or more thereof may be used in combination for the calculation. For example, in the case of using an average value, two or more of the color elements may be simply averaged to perform a calculation or each element may be multiplied by a different predetermined weighting coefficient to calculate an average value.

Alternatively, the coefficient of variation may be individually calculated from three color elements of red, green, and blue, and, for example, the maximum value, the minimum value, or the second largest numerical value among them may be used.

The above-described method is the method for acquiring the color information of the image using numerical values in the RGB color space. However, as the color information used in the present invention, luminance or brightness defined by the HSV color space, the HSB color space, the HLS color space, the HSL color space, or the like may be used.

<Calculation of Diversity of Color>

Examples of a method of calculating a diversity of color from the color information acquired by a method such as described above may include a method for calculating a variation of at least one or more elements of the color information acquired by the aforementioned method in the region.

The method of examining the variation of at least one or more elements of the color information in the region will be described. The variation is obtained by examining the color information in the RGB color space in each pixel in a predetermined region of the image and evaluating to which extent an intensity of at least one or more color elements of red, green, and blue varies in the region. As the variation, a value obtained by dividing a variance obtained from a value of each element by an average value of the luminance of the pixel in the region may be used, or a value obtained by dividing a deviation value (standard deviation or the like) calculated therefrom by an average value of the luminance of the pixel in the region, that is, a coefficient of variation, may be used. These values may be optionally selected and used as needed.

What is important here is that the variation of the luminance thus calculated is divided by the average value of the luminance. For example, even if a subject is photographed in a dark state or a bright state, or even if the subject is photographed in a short exposure time or a long exposure time, the physical complexity of the structure of the subject itself is unique and does not change. However, when the standard deviation is calculated for the color information related to the luminance or the like of the image and the calculated value is used as a numerical value indicating the complexities of the structure and color, the standard deviation is large in the bright illumination and small in the dark illumination. Thus, the complexity obtained is different from each other. When the variation is evaluated by a coefficient of variation obtained by dividing the variation by the average value, the complexity is hardly changed and a constant value is maintained even when the image is a bright image or a dark image. Therefore, it is possible to perform correct evaluation.

<Region Subjected to Calculation of Diversity of Color in Image>

The diversity of color thus obtained may be calculated using the entire image. Alternatively, the diversity of color may be calculated in a region of each grid after optionally dividing the image into a grid shape.

In a case where the entire image or the divided region has a large area, the calculation can be performed at a low cost, thereby making it possible to instantly analyze a plurality of the still images and display numerical values.

On the other hand, when the number of the regions divided into a grid shape is increased to reduce an area of each region, the diversity of color can be evaluated in a further smaller region. In this case, the calculation cost increases with an increase in the number of the divided regions, and thus the immediacy of the analysis is vanishing.

Further, each pixel or a pixel region in which several adjacent pixels are grouped together is defined in the image and the diversity of color may be obtained in pixels surrounding each pixel or in the pixel region. The diversity of color thus obtained has further higher resolution than that in the aforementioned method in which the image is divided into a grid shape. Further, such a method is advantageous in that spatial position information is completely matched with that of the original still image. On the other hand, the method requires a huge calculation cost and thus has low immediacy. Thus, the method may be preferably used for performing detailed analysis of the image which has been recorded once.

Note that the original still image may be appropriately magnified or reduced for calculating the diversity of color. As a magnification method, a method in which a gap of the luminance of pixel is interpolated by a function such as a bilinear method, a bicubic method, or a Lanczos method is preferable. As an effect of magnification, the state information that varies depending on each site can be acquired in more detail. On the other hand, as a method for reduction, any methods such as a nearest-neighbor method, a bilinear method, a bicubic method, and a Lanczos method may be used. As an effect of reduction, shortening of analysis time can be mentioned. These methods may be appropriately selected and used according to the need.

The diversity of color, which is obtained from the still image in each grid, pixel, or region such as a pixel group, may be two-dimensionally arranged, and then stored and displayed as an image that shows the state of the complexities of the structure and color in the image. For creating an image, the diversity may be expressed with a gray scale in which the luminance is increased or decreased depending on a value of the diversity. Alternatively, heat map colors obtained on the basis of a value of the diversity may be used to further facilitate the recognition of a difference. Performing such a procedure makes it possible to emphatically display the complex site of the structure in the image.

Example 1

FIG. 1 shows diagrams in which apart of a plastic part having a surface that has been subjected to an emboss processing is photographed with various exposure times, and a graph in which the number of pixels for each luminance in the image is plotted.

FIG. 2 shows the standard deviation (SD) of the luminance of the color element of the pixel and the coefficient of variation (CV (%)) obtained by dividing the standard deviation by the average value. The numerical value of the standard deviation increased as the exposure time increased. This indicates that it is necessary to photograph with a fixed exposure time in order to use the standard deviation as a numerical value representing the complexity of the structure. On the other hand, the coefficient of variation obtained by dividing the calculated standard deviation by the average value of the luminance of the image showed a constant value even when the exposure time increased, and thus, it was shown that the standard deviation can be used as a numerical value that represents the complexity of the structure that is not easily affected by the photographing time.

In FIG. 3, livers of mice that developed non-alcoholic fatty liver were cross-sectioned and the fat contained was stained with Oil Red O. The thus obtained sample was photographed under a microscope using an illumination light source of various brightness. The staining complexity of the images at this time was evaluated by standard deviation (SD) and coefficient of variation (CV (%)). As the results shown in the table of the drawing, the standard deviation increased as the illumination light source became brighter, but the coefficient of variation was constant regardless of the brightness of the illumination light source. This indicates that the coefficient of variation can be used as a numerical value which is less susceptible to the effect of the brightness of the illumination light source.

While the present invention has been described above, it is to be understood that the present invention is not limited to the above-described examples and may be modified and embodied in various aspects.

INDUSTRIAL APPLICABILITY

The present invention is an image analysis method that can be applied to a wide range of applications such as analyses of the complexities of structures and colors contained in images obtained by photographing biological and medical specimens such as organs or body parts constituting a living body, as well as tissues themselves, or cross sections thereof, and cultured cells, cosmetic evaluation including evaluation of the surface condition of human skin and nails, evaluation of the liquid layer state (oil film or moisturizing state) of a surface using interference fringes reflected in the image data at the time of photographing, analysis of material distortion, and analysis of astronomical photography and aerial photography.

The invention claimed is:

1. An image analysis evaluation method comprising:
   a step of acquiring color information of each pixel in a predetermined region in a still image;
   a step of calculating a numerical value indicating a diversity of color from the acquired color information;
   a step of calculating an average value of the color information; and
   a step of calculating a coefficient of variation on a basis of the calculated numerical value indicating the diversity of color and the calculated average value of the color information, wherein:
   the coefficient of variation is used as an index for evaluating the image, and
   the coefficient of variation is a numerical value obtained by following equation:
   coefficient of variation =[the numerical value indicating the diversity of the color information]/[the average value of the color informations].

2. The image analysis evaluation method according to claim 1, wherein
   the color information is luminance or brightness of the pixel, and
   the numerical value indicating the diversity of color is a variation of the luminance or the brightness.

3. The image analysis evaluation method according to claim 2, wherein the variation of the luminance or the brightness is a standard deviation of the luminance or the brightness.

4. The image analysis evaluation method according to claim 1, comprising:
   a step of calculating a region area of a region indicated by the coefficient of variation that exceeds a threshold value; and
   a determination step of determining whether the region area exceeds a threshold value.

5. A non-transitory computer-readable storage medium storing a program, the program, when executed, causing a computer to execute the respective steps as set forth in claim 1.

6. An image analysis evaluation device comprising:
a processing unit; and
a storing unit configured to store a still image,
wherein the processing unit is configured to:
acquire color information of each pixel in a predetermined region of a still images;
calculate a numerical value indicating a diversity of color from the acquired color information;
calculate an average value of the color information; and
calculate a coefficient of variation on a basis of the calculated numerical value indicating the diversity of color and the calculated average value of the color information, wherein:
the coefficient of variation is used as an index for evaluating the image, and
the coefficient of variation is a numerical value obtained by following equation:
coefficient of variation =[the numerical value indicating the diversity of the color information]/[the average value of the color information].

* * * * *